United States Patent
Ma et al.

(10) Patent No.: US 12,422,582 B2
(45) Date of Patent: Sep. 23, 2025

(54) UPDATING SUBSURFACE STRUCTURAL MAPS WITH WELL-MEASURED ORIENTATION DATA WHILE PRESERVING LOCAL GEOLOGICAL STRUCTURES

(71) Applicant: SAUDI ARABIAN OIL COMPANY, Dhahran (SA)

(72) Inventors: Yue Ma, Beijing (CN); Xu Ji, Beijing (CN); Nasher Muqbel Albinhassan, Beijing (CN)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/263,319

(22) PCT Filed: Feb. 3, 2023

(86) PCT No.: PCT/CN2023/074354
§ 371 (c)(1),
(2) Date: Jul. 27, 2023

(87) PCT Pub. No.: WO2024/159506
PCT Pub. Date: Aug. 8, 2024

(65) Prior Publication Data
US 2024/0427041 A1    Dec. 26, 2024

(51) Int. Cl.
*E21B 49/00* (2006.01)
*E21B 41/00* (2006.01)
*G01V 1/30* (2006.01)

(52) U.S. Cl.
CPC ............. *G01V 1/302* (2013.01); *E21B 49/00* (2013.01); *G01V 1/307* (2013.01); *E21B 41/00* (2013.01); *G01V 2210/61* (2013.01)

(58) Field of Classification Search
CPC ...... E21B 49/00; E21B 41/00; G01V 2210/61; G01V 2210/616; G01V 2210/6161; G01V 1/282; G01V 1/302
See application file for complete search history.

(56) References Cited

U.S. PATENT DOCUMENTS

| | | | |
|---|---|---|---|
| 7,557,581 B2 * | 7/2009 | Ostermeier | G01V 3/28 |
| | | | 324/338 |
| 8,095,318 B2 * | 1/2012 | Heliot | G01V 3/20 |
| | | | 702/6 |

(Continued)

FOREIGN PATENT DOCUMENTS

| | | |
|---|---|---|
| CA | 2 804 354 A1 | 8/2014 |
| CN | 102253411 A | 11/2011 |

(Continued)

OTHER PUBLICATIONS

Y. Ma, et al., "Automatic integration of 3D reflection seismic and well-measured orientation in sedimentary basins", First International Meeting for Applied Geoscience & Energy, 2021, pp. 1131-1135 (5 pages).

(Continued)

*Primary Examiner* — Daniel P Stephenson
(74) *Attorney, Agent, or Firm* — Osha Bergman Watanabe & Burton LLP

(57) ABSTRACT

The methods may include obtaining a seismic dataset regarding a subsurface region of interest and obtaining a well log for each of multiple wellbores penetrating the subsurface region of interest. The methods may also include determining a geological surface from the seismic dataset, wherein the geological surface includes seismic-estimated orientation data estimated at multiple points on the geological surface. The methods may further include determining an intersection point for each of the multiple wellbores with the geological surface, wherein the intersection point includes (Continued)

well-measured orientation data. The methods may still further include generating an updated geological surface by updating the seismic-estimated orientation data at the multiple points on the geological surface based, at least in part, on the well-measured orientation data.

13 Claims, 9 Drawing Sheets

(56) References Cited

U.S. PATENT DOCUMENTS

| | | | |
|---|---|---|---|
| 8,931,580 | B2 | 1/2015 | Cheng et al. |
| 9,581,710 | B2* | 2/2017 | Leiceaga ............... G01V 1/345 |
| 10,877,171 | B2* | 12/2020 | Ramsay ................. E21B 49/00 |
| 2008/0236270 | A1 | 10/2008 | Denichou et al. |
| 2009/0157361 | A1* | 6/2009 | Toghi .................... E21B 47/022 703/3 |
| 2010/0149917 | A1* | 6/2010 | Imhof .................... G01V 1/345 367/53 |
| 2013/0085676 | A1 | 4/2013 | Sonneland et al. |
| 2016/0320512 | A1 | 11/2016 | Zhao et al. |
| 2016/0364508 | A1* | 12/2016 | Glazkova .............. G01V 20/00 |
| 2020/0011167 | A1 | 1/2020 | Zhao et al. |
| 2020/0033501 | A1 | 1/2020 | Nyrnes et al. |
| 2020/0300064 | A1 | 9/2020 | Gee et al. |
| 2022/0129788 | A1 | 4/2022 | Zhang et al. |

FOREIGN PATENT DOCUMENTS

| | | |
|---|---|---|
| CN | 104520734 A | 4/2015 |
| CN | 106934858 A | 7/2017 |
| CN | 109267996 A | 1/2019 |
| CN | 112987086 A | 6/2021 |
| CN | 114562244 A | 5/2022 |
| EP | 0796442 B1 | 12/2001 |
| WO | 2009126375 A1 | 10/2009 |
| WO | 2013164685 A2 | 11/2013 |
| WO | 2018/156354 A1 | 8/2018 |
| WO | 2020222050 A1 | 11/2020 |
| WO | 2022050967 A1 | 3/2022 |

OTHER PUBLICATIONS

F. Yong et al., "Estimation of lateral correlation length from deep seismic reflection profile based on stochastic model", Acta Geophysica, 2021, vol. 69, pp. 1297-1312 (16 pages).

International Search Report and Written Opinion of the International Searching Authority issued in corresponding International Application No. PCT/CN2022/107763, mailed Apr. 26, 2023 (9 pages).

International Search Report and Written Opinion of the International Searching Authority issued in corresponding International Application No. PCT/CN2023/074354, mailed May 23, 2023 (9 pages).

Stewart, S.A., 2018. Generalization and multiscale structure of subsurface structural maps. Interpretation 6, T1045-T1054 (10 pages).

Stewart, S.A., 2020, Scale dependence of strike and dip in sedimentary basins: Implications for field measurements and integrating subsurface datasets, Journal of Structural Geology, 131, 103943 (8 pages).

Thore, P., Shtuka, A., Lecour, M., Ait-Ettajer, T., Cognot, R., 2002. Structural uncertainties: Determination, management, and applications. Geophysics 67, 840-852 (13 pages).

V. Tschannen et al; "Extracting Horizon Surfaces from 3D Seismic Data using Deep Learning"; Geophysics, vol. 85, No. 3, pp. N17-N26; May-Jun. 2020 (10 pages).

Non-Final Office Action issued by U.S. Patent Office for corresponding U.S. Appl. No. 18/008,081, mailed Dec. 6, 2024 (21 pages).

* cited by examiner

UPDATING SUBSURFACE STRUCTURAL MAPS WITH WELL-MEASURED ORIENTATION DATA WHILE PRESERVING LOCAL GEOLOGICAL STRUCTURES

BACKGROUND

Interpretation of acquired three-dimensional (3D) reflection seismic data may involve the generation of structure maps of geological boundaries over large areas. To reduce uncertainties related to limitations in data acquisition and processing, maps made from seismic data are often correlated with well-acquired depth measurements at well control points, where a well penetrates the geological boundary. However, orientation information measured in wells penetrating the geological boundaries may not be used directly to constrain the maps due to, among other things, the seismic and well measurements being performed at different spatial scales.

Successful projection of stratigraphic features in the subsurface is typically dependent on the ability of a geologist to reconstruct the geological history, including interpretations of the depositional environment for the stratigraphic section. Specific types of stratigraphic traps, such as reefs and sandstone bars, have been recognized from a well log where known patterns of dip over the flanks of such features help to define their position with respect to the borehole. Orientation data are treated only statistically and incorporated with other log data for defining the structural and textural patterns of stratigraphic features. Orientation data regarding local geological structures such as faults are also important to consider when reconstructing the geological history of the subsurface.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method. The method includes obtaining a seismic dataset regarding a subsurface region of interest and obtaining a well log for each of a plurality of wellbores penetrating the subsurface region. The method also includes determining a geological surface from the seismic dataset, wherein the geological surface includes seismic-estimated orientation data estimated at a plurality of points on the geological surface. The method further includes determining an intersection point for each of the plurality of wellbores with the geological surface, wherein the intersection point includes well-measured orientation data. The method still further includes generating an updated geological surface by updating the seismic-estimated orientation data at the plurality of points on the geological surface based, at least in part, on the well-measured orientation data.

In general, in one aspect, embodiments disclosed herein relate to a system. The system includes a seismic acquisition system, a logging system, and a seismic processor. The seismic acquisition system is configured to record a seismic dataset regarding a subsurface region of interest and the logging system is coupled to a plurality of logging tools. The seismic processor is coupled to the seismic acquisition system and to the logging system and configured to receive a seismic dataset regarding a subsurface region of interest. The seismic processor is also configured to obtain a well log for each of a plurality of wellbores penetrating the subsurface region of interest. The seismic processor is further configured to determine a geological surface from the seismic dataset, wherein the geological surface includes seismic-estimated orientation data estimated at a plurality of points on the geological surface. The seismic processor is still further configured to determine an intersection point for each of the plurality of wellbores with the geological surface, wherein the intersection point includes well-measured orientation data. The seismic processor is further configured generate an updated geological surface by updating the seismic-estimated orientation data at the plurality of points on the geological surface based, at least in part, on the well-measured orientation data.

Other aspects and advantages of the claimed subject matter will be apparent from the following description and the appended claims.

DETAILED DESCRIPTION

Figure 1:
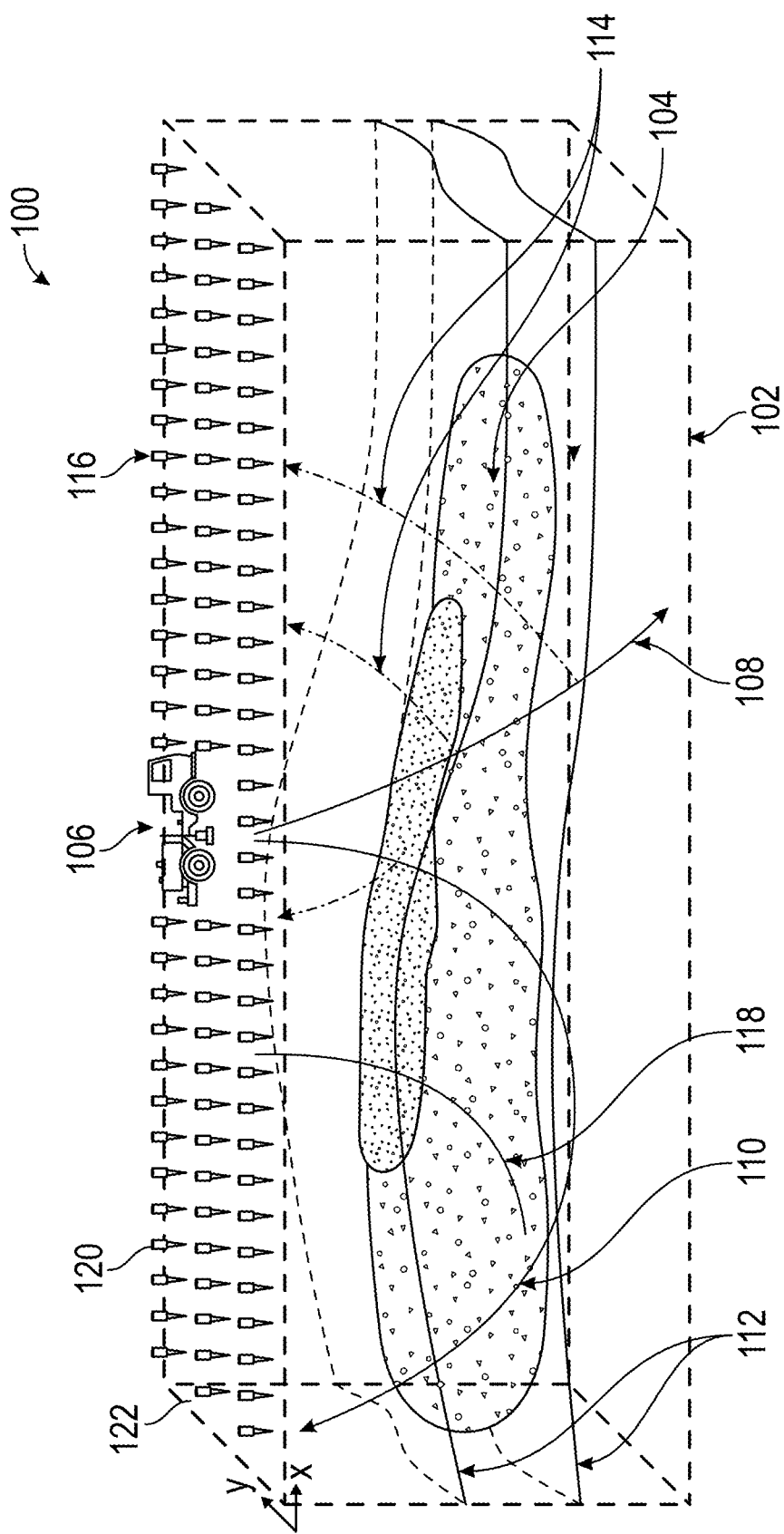
FIG. 1 illustrates a seismic acquisition system of a subsurface region of interest, flowchart in accordance with one or more embodiments

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-9, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic signal" includes reference to one or more of such seismic signals.

Terms such as "approximately." "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

In general, disclosed embodiments include systems and methods to constrain subsurface structural maps with orientation information of geological surfaces measured in subsurface wells, as well as to integrate the orientation information of local geological structures. Subsurface structural maps are instrumental in the identification of faults, channels, depositional environments, and in determining the structural deformation history in a region. The orientation (dip and azimuth) of geological surfaces such as bedding or fracture planes varies with scale of observation. For example, dipmeter image logs are usually at centimeter-scale. They are incorporated with other log data for defining the structural and textural patterns of stratigraphic features. On the other hand, 3D seismic data, usually acquired during seismic surveys in the search of hydrocarbons, cover large areas of sedimentary basins, up to tens of thousands of square kilometers. 3D seismic data can be processed to construct subsurface structural maps in sedimentary basins. Standard spatial resolution of these subsurface structural maps may provide a spacing of 25 m or 12.5 m on a regular Cartesian coordinate.

Subsurface structural maps are often constrained with structural depths that are acquired at penetrating wells. However, structural orientation information, measured on image logs from wells, has always been neglected during the mapping operations due to the scale difference between the 3D seismic data and the well-logging data. Without the constrains of structure orientation measured at wells, the accuracy of the mapped subsurface structures depends solely on the signal processing and seismic modeling processes, resulting in large geometrical uncertainties.

FIG. 1 shows a seismic acquisition system (100) of a subsurface region of interest (102), according to one or more embodiments. The subsurface region of interest (102) may contain a gas deposit (120) that may form part of a hydrocarbon reservoir ("reservoir") (104). The gas may be methane, ethane, or another hydrocarbon gas. The seismic acquisition system (100) may be located in many places on the earth's surface, including onshore (land) and offshore (marine) domains. The seismic acquisition system (100) may utilize a seismic source (106) that generates radiated seismic waves (108). The radiated seismic waves (108) may return to the surface (122) as refracted seismic waves (110) or reflected seismic waves (114). Reflected seismic waves (114) occur due to geological discontinuities (112). At the surface (122), refracted seismic waves (110) and reflected seismic waves (114) may be detected by seismic receivers (116).

In some embodiments, "a seismic dataset" may refer to the refracted seismic waves (110) and reflected seismic waves (114) generated by a single activation of the seismic source (106) that are recorded by a seismic receiver (116). A seismic dataset may include on or more time-series representing the amplitude of ground-motion at a sequence of discrete times. This time-series may be denoted a time-domain seismic "trace". A seismic source (106) may be positioned at a location denoted $(x_s, y_s)$ where x and y represent orthogonal axes on surface (122) above the subsurface region of interest (102). The seismic receivers (116) are positioned at a plurality of seismic receiver locations denoted $(x_r, y_r)$. Thus, the refracted seismic waves (110) and reflected seismic waves (114) generated by a single activation of the seismic source (106) may be represented in the axes $(x_s, y_s, x_r, y_r, t)$ where t delimits the time sample at which the amplitude of ground-motion was measured by a seismic receiver (116).

Seismic processing may reduce five-dimensional seismic data produced by a seismic acquisition system (100) to three-dimensional (x,y,t) seismic data. For example, the five-dimensional seismic data may be reduced to three-dimensional seismic data by correcting the recorded time of seismic waves for the time of travel from the seismic source (106) to the seismic receiver (116) and summing ("stacking") samples over two horizontal space dimensions. Alternatively, five-dimensional seismic data may be reduced to three-dimensional seismic data using pre-stack time-domain, or pre-stack depth domain seismic imaging ("migration"). However, seismic data may also refer to data acquired over different periods of time, such as in cases where seismic surveys are repeated to obtain time-lapse data. Seismic data may also refer to various seismic attributes derived in response to processing acquired seismic data. Likewise, seismic data may also refer to processed data, e.g., using a seismic inversion operation, to generate a velocity model of a subterranean formation, or a migrated seismic volume of a rock formation within the subsurface region of interest (102). Seismic data may also be pre-processed data, e.g., arranging time domain data within a two-dimensional shot gather.

Figure 2:
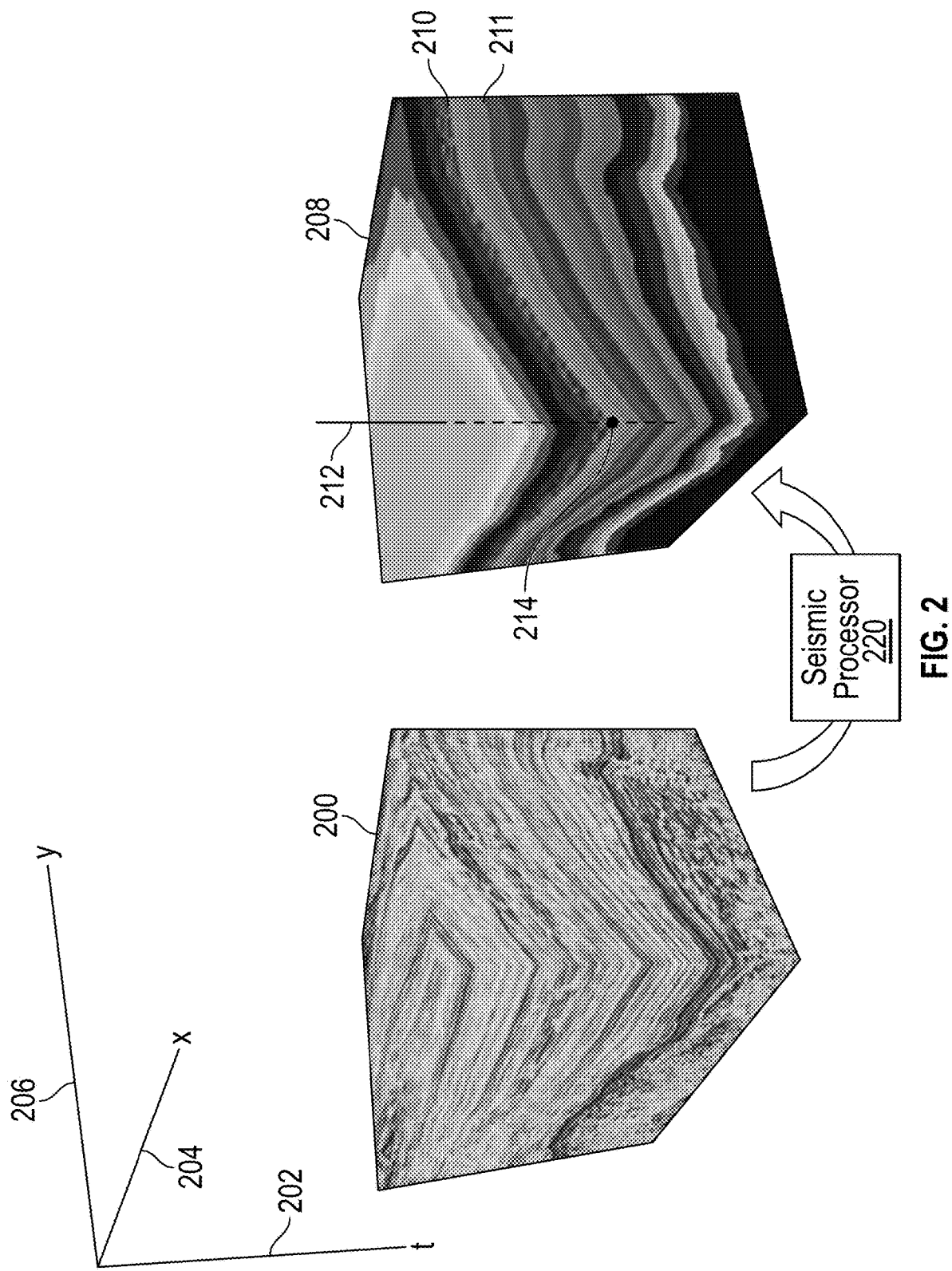
FIG. 2 shows an example of a seismic dataset produced by a seismic acquisition system in accordance with one or more embodiments.

FIG. 2 shows an example of a seismic dataset (200) in the form of a migrated seismic volume, according to one or more embodiments. The three-dimensional seismic dataset (200) is described using a time axis (202), a first spatial dimension (204), and a second spatial dimension (206). A migrated seismic volume may be generated using a process called seismic migration. In seismic migration, seismic events in a surface recording are relocated in either time or space to the location the event occurred in the subsurface. Various types of migration algorithms may be used to generate a migrated seismic volume. For example, one type of migration algorithm corresponds to reverse time migration.

Processing of a seismic dataset (200) by a seismic processor (220) may reveal the three-dimensional geometry of geological structures down to tens of kilometers depth with a resolution of tens of meters or less. In a seismic dataset (200) seismic events may be associated with geological interfaces to produce a seismic image (208) including one or more "geological surfaces" (210, 211), as shown schematically in FIG. 2. Further, a seismic image (208) of high resolution may be obtained if densely-recorded data is acquired by using closely-spaced shots and seismic receivers. For example, seismic waves with a bandwidth extending up to 100 Hz or more may resolve thin features. While dependent on an accurate velocity model, processing a seismic dataset (200) has the potential to produce a seismic image (208) with much more resolution than with refraction methods.

As illustrated in FIG. 2, geological surfaces (210, 211) in a seismic image (208) may be located in 3D space with depth and orientation that varies in the two horizontal dimensions, x and y. While the depth may be specified in terms of the vertical dimension z, the orientation of the geological surfaces (210, 211) may be provided in terms of angles such as azimuth, dip and/or strike. In zones of structural and stratigraphic low-relief, minor changes in orientation of the geological surfaces (210, 211) can lead to significant variations, and thus uncertainties, in the spatial distribution and volume of stratigraphic traps.

Furthermore, if the subsurface geology is complex with large heterogeneities in seismic velocity or when a seismic survey is not acquired on a horizontal plane, the results of seismic imaging may present large uncertainties. Ocean-Bottom-Node surveys and rough topographic land seismic surveys may be examples where the resulting images fail to depict correctly subsurface geologies.

If a seismic dataset (200) indicates the presence of hydrocarbons in the subsurface region of interest (102), a drilling system may drill a wellbore (118) to access those hydrocarbons.

Figure 3:
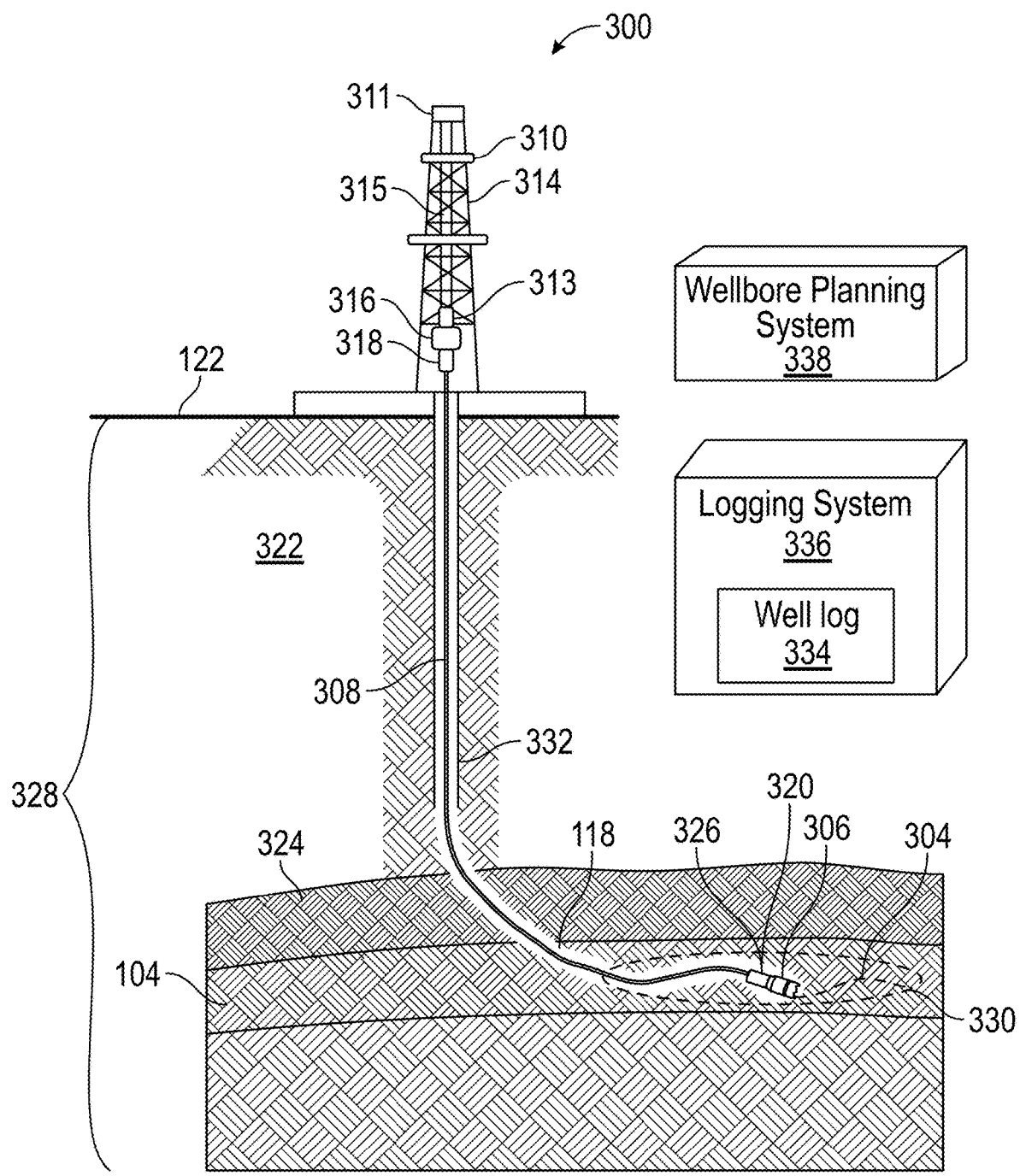
FIG. 3 shows a schematic diagram of a well site in accordance with one or more embodiments.

FIG. 3 shows a drilling system (300) in accordance with one or more embodiments. As shown in FIG. 3, a wellbore (118) following a wellbore trajectory (304) may be drilled by a drill bit (306) attached by a drillstring (308) to a drilling rig (310) located on the surface (122) of the earth. The drilling rig (310) may include framework, such as a derrick (314) to hold drilling machinery. A crown block (311) may be mounted at the top of the derrick (314), and a traveling block (313) may hang down from the crown block (311) by means of a cable (315) or drilling line. One end of the cable (315) may be connected to a drawworks (not shown), which is a reeling device that may be used to adjust the length of the cable (315) so that the traveling block (313) may move up or down the derrick (314).

A top drive (316) provides clockwise torque via the drive shaft (318) to the drillstring (308) in order to drill the wellbore (118). The drillstring (308) may comprise a plurality of sections of drillpipe attached at the uphole end to the drive shaft (318) and downhole to a bottomhole assembly ("BHA") (320). The BHA (320) may be composed of a plurality of sections of heavier drillpipe and one or more measurement-while-drilling ("MWD") tools configured to measure drilling parameters, such as torque, weight-on-bit, drilling direction, temperature, etc., and one or more logging tools (326) configured to measure parameters of the rock surrounding the wellbore (118), such as electrical resistivity, density, sonic propagation velocities, gamma-ray emission, etc. MWD and logging tools (326) may include sensors and hardware to measure downhole drilling parameters, and these measurements may be transmitted to the surface (122) using any suitable telemetry system known in the art. The BHA (320) and the drillstring (308) may include other drilling tools known in the art but not specifically shown.

The wellbore (118) may traverse a plurality of overburden (322) layers and one or more formations (324) to a reservoir (104) within the subterranean region (328), and specifically to a drilling target (330) within the reservoir (104). The wellbore trajectory (304) may be a curved or a straight trajectory. All or part of the wellbore trajectory (304) may be vertical, and some wellbore trajectory (304) may be deviated or have horizontal sections. One or more portions of the wellbore (118) may be cased with casing (332) in accordance with the wellbore plan.

To start drilling, or "spudding in" the well, the hoisting system lowers the drillstring (308) suspended from the derrick (314) towards the planned surface location of the wellbore (118). An engine, such as an electric motor, may be used to supply power to the top drive (316) to rotate the drillstring (308) through the drive shaft (318). The weight of the drillstring (308) combined with the rotational motion enables the drill bit (306) to bore the wellbore (118).

The drilling system (300) may be disposed at and communicate with other systems in the well environment, such as a seismic processor (220), a logging system (336), and a wellbore planning system (338). The drilling system (300) may control at least a portion of a drilling operation by providing controls to various components of the drilling operation. In one or more embodiments, the logging system (336) may receive well-measured data from one or more sensors and/or logging tools (326) arranged to measure controllable parameters of the drilling operation. Well-measured data may be used by the logging system (336) to generate a well log (334). During operation of the drilling system (300), the well-measured data may include mud properties, flow rates, drill volume and penetration rates, rock physical properties, characteristics of formation (324), etc.

In some embodiments, the well-measured data are recorded in real time, and are available for review or use within seconds, minutes or hours of the condition being sensed (e.g., the measurements are available within 1 hour of the condition being sensed). In such an embodiment, the well-measured data may be referred to as "real-time" well-measured data. Real-time well-measured data may enable an operator of the drilling system (300) to assess a relatively current state of the drilling system (300), and make real-time decisions regarding a development of the drilling system (300) and the reservoir (104), such as on-demand adjustments in drilling fluid and regulation of production flow from the well.

In some embodiments, the rock physical properties may be used by a seismic processor (220) to determine a location of a reservoir (104) (or other subterranean features). Knowledge of the existence and location of the reservoir (104) and other subterranean features may be transferred from the seismic processor (220) to a wellbore planning system (338). The wellbore planning system (338) may use information regarding the reservoir (104) location to plan a well, including a wellbore trajectory (304) from the surface (122) of the earth to penetrate the reservoir (104). In addition, to the depth and geographic location of the reservoir (104), the planned wellbore trajectory (304) may be constrained by surface limitations, such as suitable locations for the surface position of the wellhead, i.e., the location of potential or preexisting drilling rig, drilling ships or from a natural or man-made island. In addition to the wellhead and drilling target (330) locations a planned wellbore trajectory (304) may be influenced by shallow drilling hazards, such as gas pockets, or subterranean water flows, or unstable or metastable fault zones.

Typically, the wellbore plan is generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. Information regarding the planned wellbore trajectory (304) may be transferred to the drilling system (300) described in FIG. 3. The drilling system (300) may drill the wellbore (118) along the planned wellbore trajectory (304) to access the reservoir (104).

Figure 4:
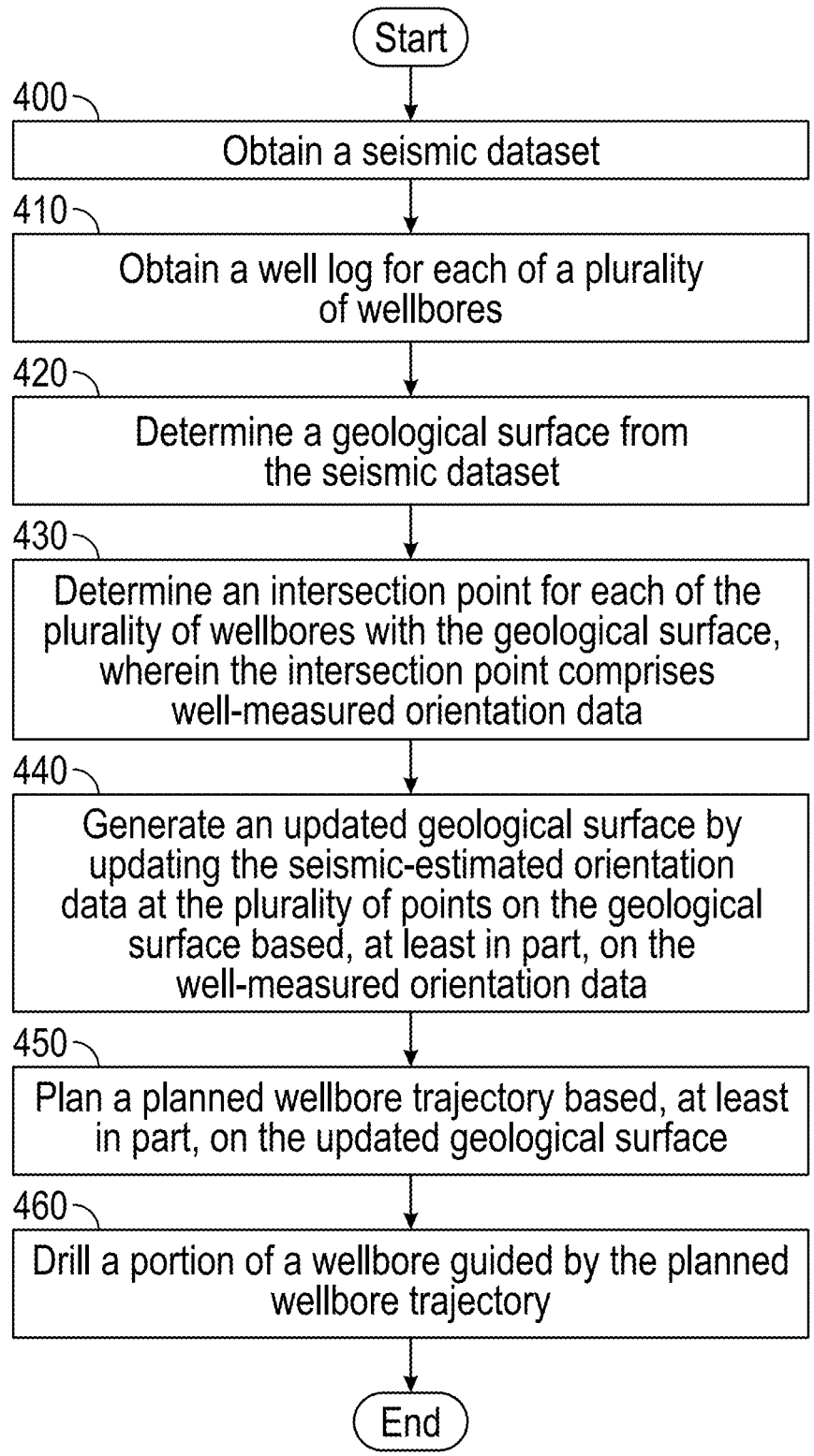
FIG. 4 shows a flowchart in accordance with one or more embodiments.

Turning to FIG. 4, FIG. 4 shows a flowchart in accordance with one or more embodiments. Specifically, FIG. 4 describes a general method to update a geological surface with well-measured orientation data. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, a seismic dataset regarding a subsurface region of interest is obtained in accordance with one or more embodiments. The seismic dataset (200) may be acquired using a seismic acquisition system (100) above a subsurface region of interest (102). The seismic dataset (200) may be processed to attenuate noise and may be organized in two orthogonal spatial dimensions (204, 206) and a time axis (202).

In Block 410, a well log for each of a plurality of wellbores penetrating the subsurface region of interest is obtained, in accordance with one or more embodiments. For example, the well log (334) may include, without limitation, dipmeter logs, electrical image logs, or ultrasonic image logs. Orientation data regarding the geological surfaces (210, 211) may be determined from each of a plurality of well logs (334) and the orientation data may be used when creating a seismic image (208) from seismic interpretation, so that the orientation of the final geological surfaces (210, 211) match the well-measured orientation as well as the depth in available wells.

Figure 5:
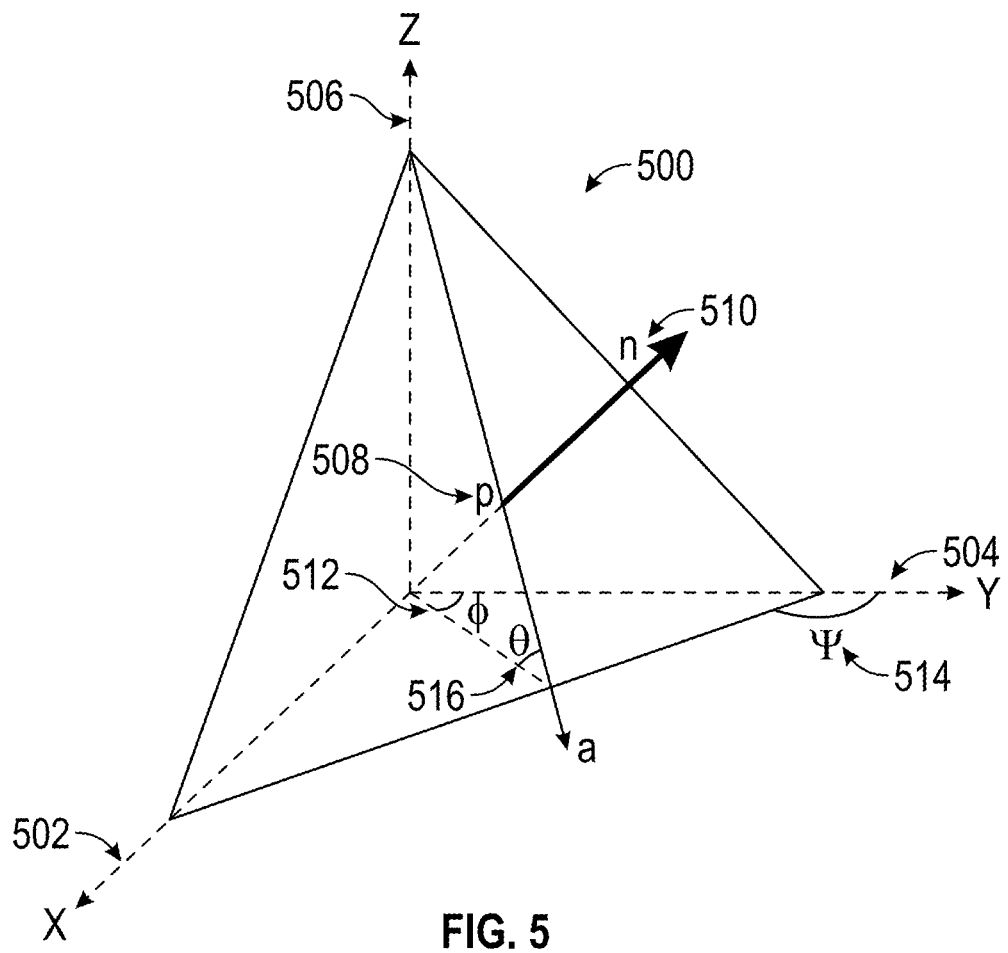
FIG. 5 illustrates an element of the geological surface in accordance with one or more embodiments.

In Block 420, a geological surface is determined from the seismic dataset, in accordance with one or more embodiments, wherein the geological surface includes seismic-estimated orientation data estimated at a plurality of points on the geological surface. Specifically, the geological surface (210) may include an estimated vector normal to the geological surface (210) at a plurality of points on the geological surface (210). The geological surface (210) may describe a formation top or internal bedding surface. The vector normal to the geological surface (210) may be estimated from a seismic dataset (200) that has been processed to generate a seismic image (208). An element of the geological surface (500) in 3D may be described in a Cartesian coordinate system, as illustrated in FIG. 5. In the Cartesian coordinate system, X (502) and Y (504) are two horizontal axes, and Z (506) is an axis in the depth/time direction. The element of the geological surface (500) may then be defined uniquely by a point in space, p (x, y, z) (508), and a unit vector normal to the element, n=($n_x$, $n_y$, $n_z$) (510), where $n_x$, $n_y$ and $n_z$ denote the components of n along the X-, Y- and Z-axes, respectively. The unit normal vector n (510), may be obtained with the following equation:

$$n = \frac{\left(-\frac{\partial z}{\partial x}, -\frac{\partial z}{\partial y}, 1\right)}{\sqrt{\left(\frac{\partial z}{\partial x}\right)^2 + \left(\frac{\partial z}{\partial y}\right)^2 + 1}} \quad \text{Equation (1)}$$

where the derivatives ∂z/∂x and ∂z/∂y denote the apparent dip along the X- and Y-axis, respectively. The derivatives ∂z/∂x and ∂z/∂y may be computed by first-order finite differences of the adjacent grid nodes. The element of the geological surface (500) may be further described by angular data, including the azimuth ϕ (512), the strike y (514), and the dip θ (516), as shown in FIG. 5. The strike ψ (514) is the angle between North (the Y-axis) and the intersection of the element of the geological surface (500) and the horizontal (x, y)-plane. The dip θ (516) is the angle measured in a vertical plane between the horizontal (x, y)-plane and the element of the geological surface (500).

$$\theta = \arccos\left(1 / \sqrt{\left(\frac{\partial z}{\partial x}\right)^2 + \left(\frac{\partial z}{\partial y}\right)^2 + 1}\right) \quad \text{Equation (2)}$$

while the azimuth ϕ is measured in the horizontal (x,y)-plane clockwise from the North:

$$\phi = \arctan\left(\frac{\partial z}{\partial x} \Big/ \frac{\partial z}{\partial y}\right) \quad \text{Equation (3)}$$

As shown by Equations (1)-(3) the unit normal vector n (510) and the angles ϕ (512), ψ (514), and θ (516), at the plurality of points on the geological surface may be considered as seismic-estimated orientation data, since they are estimated from the seismic image (208) generated from the seismic dataset (200).

Returning to FIG. 4, in Block 430, an intersection point for each of the plurality of wellbores with the geological surface is determined, in accordance with one or more embodiments. The locations $P_i$(x, y, z) where the wells with well-measured orientation data penetrate the geological surfaces (210, 211) are termed intersection points. An example of intersection point $P_i$(214) where a well (212) penetrates one of the geological surfaces (210, 211) is shown in FIG. 2. Determining the intersection point may include computing the unit normal vector n (510) and the angles ϕ (512) and θ (516) at the intersection points from the seismic image (208). On the other hand, given the well-measured dip θ (516) and azimuth ϕ (512) at an intersection point $P_i$(x, y, z), the unit normal vector n (510) may be computed by:

$$n = (\sin\theta \sin\phi, \sin\theta \cos\phi, \cos\theta) \quad \text{Equation (4)}$$

Combining Equations (1) and (4) provides expressions for the gradient:

$$\begin{cases} \frac{\partial z}{\partial x} = \frac{\sin\theta\sin\phi}{\cos\theta} \\ \frac{\partial z}{\partial y} = \frac{\sin\theta\cos\phi}{\cos\theta} \end{cases} \quad \text{Equation (5)}$$

Theoretically, the gradient of Equation (5) computed with seismic-estimated data and with well-measured data are equivalent. This equivalence may be used to constrain the geological surface (210) determined in Block 420 with well-measured orientation data.

In Block 440, an updated geological surface is generated by updating the seismic-estimated orientation data at the plurality of points on the geological surface based, at least in part, on the well-measured orientation data, in accordance with one or more embodiments. With the gradient derived from the well-measured orientation data, the orientation of the geological surfaces (210, 211) around the well (212) may be adjusted to match the well-measured orientation data. The gradient at an intersection point $P_i$(214) determined based on well-measured orientation data may be incorporated into an interpolation process as a boundary condition. Furthermore, since the intersection point $P_i$ (214) is chosen to be an interpolation node, the geological surface (210) is tied to the well-measured orientation data at such location. The geological surface (210) may be updated by performing 2D cubic spline interpolation of the gradient of the geological surface (210), according to one or more embodiments.

Figure 6:
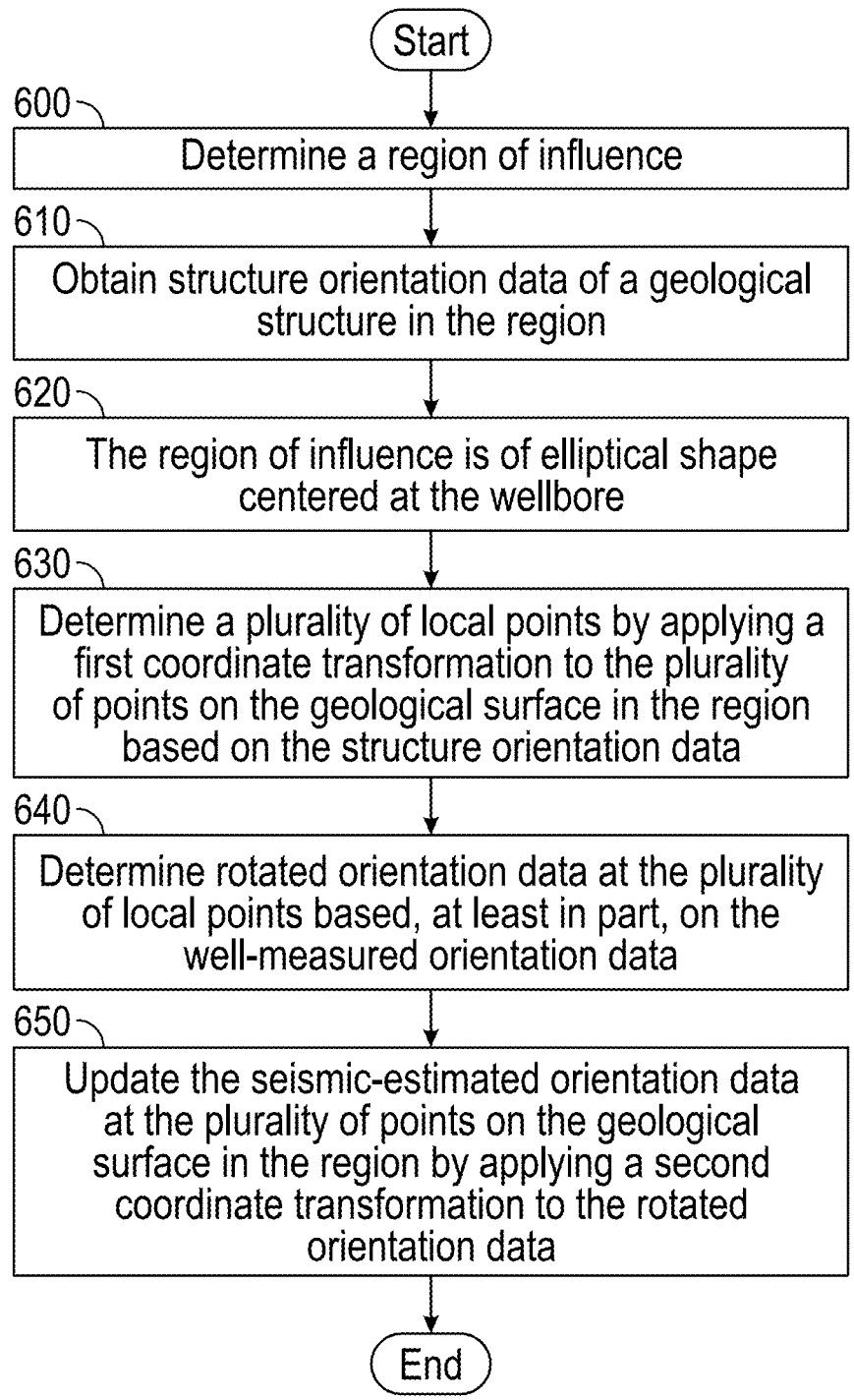
FIG. 6 shows a flowchart in accordance with one or more embodiments.

In some embodiments, interpolation of the gradient may be performed using the plurality of points on the geological surface as interpolation nodes. In other embodiments interpolation of the gradient may be performed in a region of influence, as illustrated in the method of FIG. 6. In Block (600) of FIG. 6 a region of influence is determined for each of the of the plurality of wellbores. Such region of influence may be determined to enclose one or more local geological structures close to a wellbore (118) with structure orientation data that is desirable to preserve. As a non-limiting example, a local geological structure close to the wellbore (118) may have portions located within a radius of 1 km from the wellbore. In Block (610) the structure orientation data of a geological structure in the region of influence is obtained. The structure orientation data may be preserved performing interpolation of the gradient in a structure-oriented coordinate system.

Figure 7:
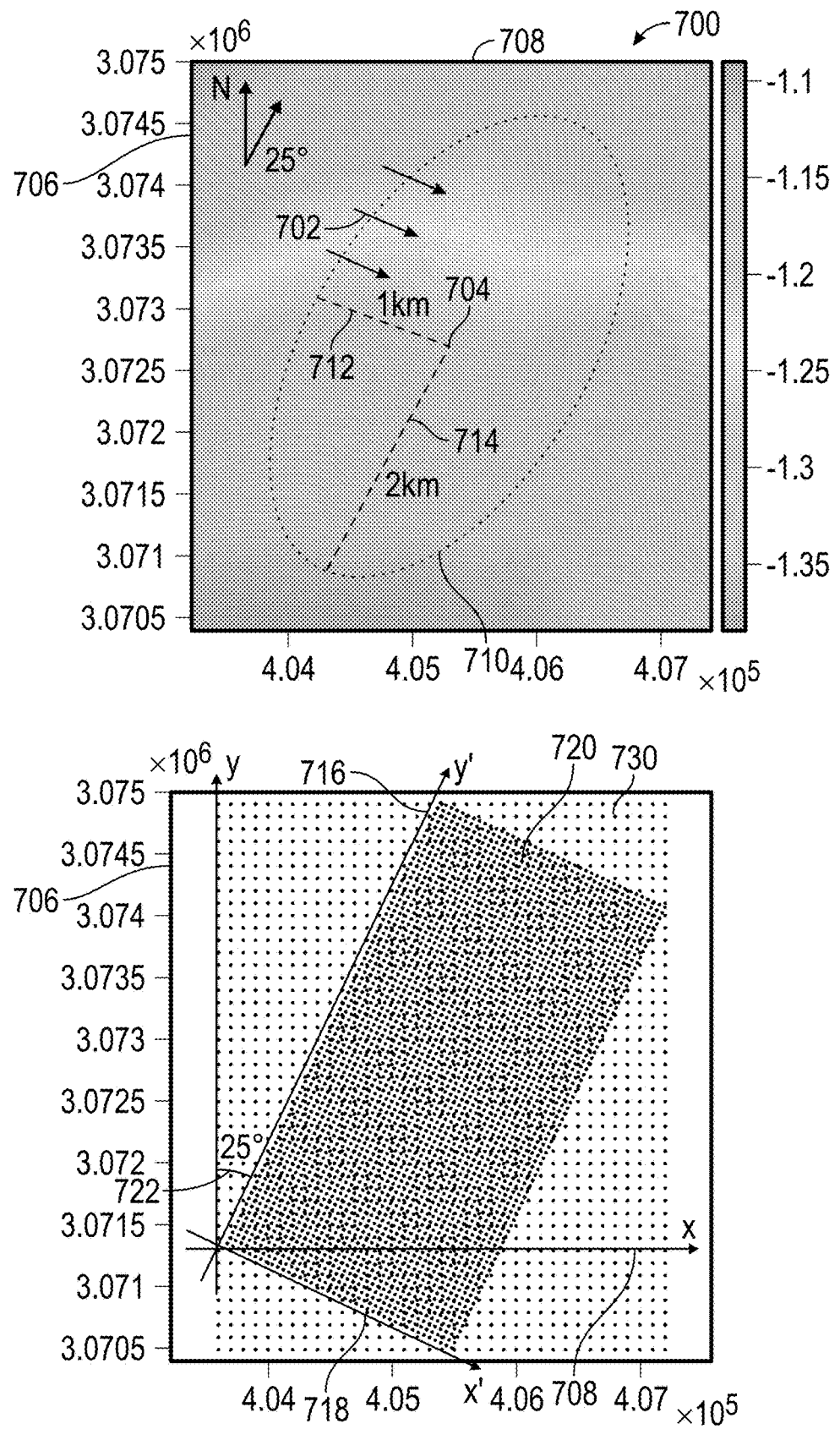
FIG. 7 illustrates shows an example of a portion of a geological surface, according to one or more embodiments.

An example of a local geological structure (702) close to a wellbore (704) is shown in FIG. 7. Specifically, FIG. 7 shows an example of a portion of a geological surface (700), according to one or more embodiments. The vertical axis (706) and the horizontal axis (708) correspond respectively to the y- and x-horizontal dimensions. The portion of the geological surface (700) has been already constrained with depth data measured at the wellbore (704). As seen in FIG. 7, the local geological structure (702), indicated by the white arrows, has an azimuth of approximately 25 degrees. In addition, a significant portion of the local geological structure (702) is at a distance of less than 1 km from the wellbore.

In one or more embodiments, the shape of the region of influence (710) may be elliptical, as shown in Block (620) of FIG. 6. Furthermore, the center of the region of influence (710) may coincide with the location of the wellbore (704). In the example of FIG. 7, with a minor radius (712) of 1 km and a major radius (714) of 2 km, the region of influence (710) centered at the wellbore (704) encloses the local geological structure (702). In order to preserve the orientation of the local geological structure (702) interpolation of the gradient may be performed in a local coordinate system with a y'-axis (716) and x'-axis (718), as shown in FIG. 7. The local coordinate system is related to the x- and y-coordinate system by an axis rotation based on the orientation data of the local geological structure (702). In the case of the local geological structure of FIG. 7 the local coordinate system is related to the x- and y-coordinate system with an axis rotation (722) of 25 degrees.

In Block (630) a plurality of local points is determined by applying a first coordinate transformation to the plurality of points on the geological surface in the region of influence based on the structure orientation data, according to one or more embodiments. The plurality of local points may be obtained with the following coordinate transformation:

$$\begin{pmatrix} x' \\ y' \end{pmatrix} = \begin{pmatrix} \cos\alpha & -\sin\alpha \\ \sin\alpha & \cos\alpha \end{pmatrix} \begin{pmatrix} x \\ y \end{pmatrix} \quad \text{Equation (6)}$$

where a is the axis rotation measured from the y-axis. FIG. 7 illustrates an example of some of the plurality of local points (720) obtained from rotating the x- and y-axes with Equations (6) and an axis rotation (722) of 25 degrees. In order to keep a desired level accuracy in the interpolation scheme, the spacing of the local points (720) in FIG. 7 has been reduced to one half the initial spacing of points on the geological surface (730), i.e., dx'=dx/2 and dy'=dy/2.

In Block (640) rotated orientation data at the plurality of local points is determined based on the well-measured orientation data. Using the well-measured azimuth (512) and dip (516), the gradient at the intersection point $P_i$(214) may be obtained. Setting the well-measure azimuth (512) and dip (516) as boundary conditions, interpolation of the gradient may be performed at the plurality of local points in the region of influence (710). The points corresponding to the local geological structure (702) may be set as intersection points in the interpolation scheme.

Finally, in Block (650) the seismic-estimated orientation data at the plurality of points on the geological surface in the region of influence (710) is updated by applying a second coordinate transformation to the rotated orientation data. The second coordinate transformation to transfer the rotated orientation data to the initial points on the geological surface (730) may be performed with the expression:

$$\begin{pmatrix} x \\ y \end{pmatrix} = \begin{pmatrix} \cos\alpha & \sin\alpha \\ -\sin\alpha & \cos\alpha \end{pmatrix} \begin{pmatrix} x' \\ y' \end{pmatrix} \quad \text{Equation (7)}$$

where a is the axis rotation measured from the y-axis. Therefore the orientation and curvature of the updated geological surface (210) at the points on the geological surface (730) may be correlated with the well-measured orientation data.

Figure 8:
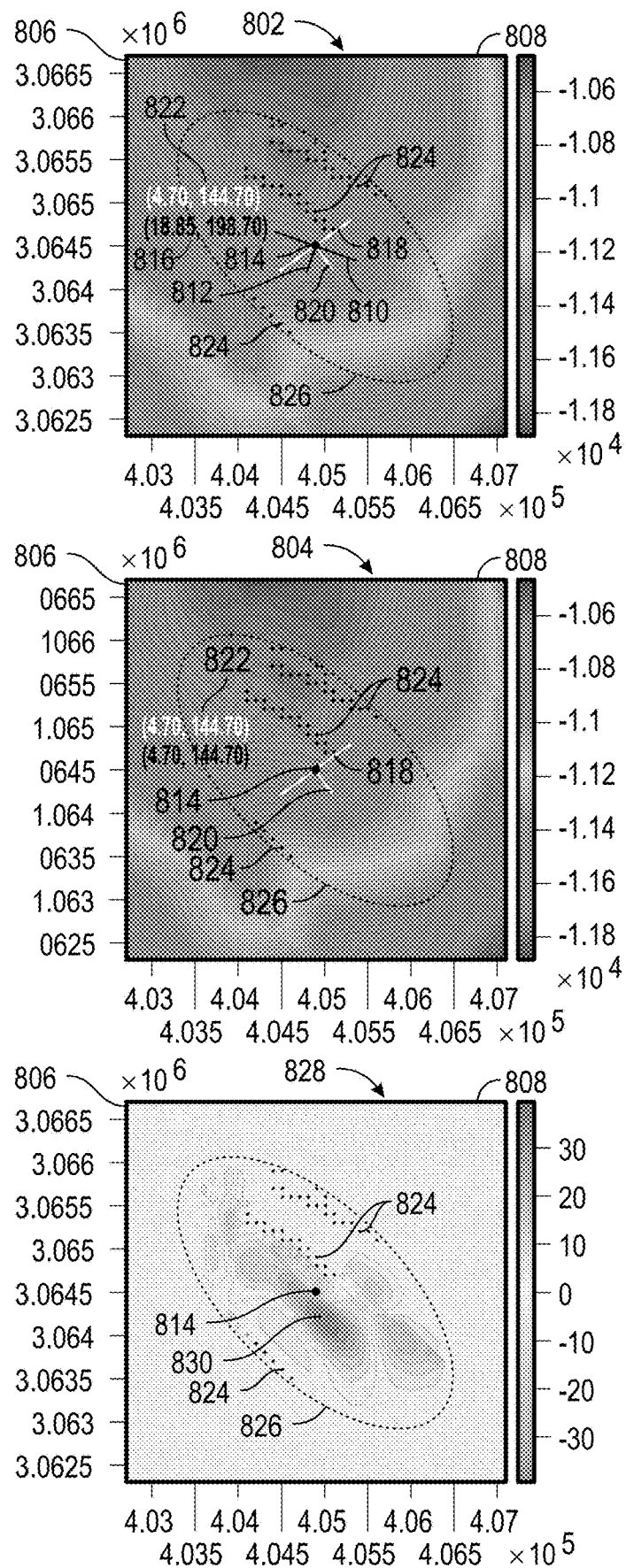
FIG. 8 illustrates an example of constraining geological surfaces with well-measured orientation data, according to one or more embodiments.

FIG. 8 shows an example of the capability of disclosed embodiments to constrain geological surfaces with well-measured orientation data, according to one or more embodiments. Specifically, FIG. 8 shows an example of a portion of a geological surface before constraining (802) and after constraining (804) it with well-measured and local-structure orientation data. The vertical axis (806) and the horizontal axis (808) correspond respectively to the y- and x-horizontal dimensions. The portion of the geological surface before constraining (802) has been already constrained with the well-measured depth data, but not with the well-measured orientation data.

Keeping with FIG. 8, the seismic-estimated strike (810) and azimuth (812) are indicated at the intersection point (814) by the long and short black lines, respectively. The magnitudes of the seismic-estimated dip and the azimuth (812) are displayed with the black legend (816). Similarly, the well-measured strike (818) and the azimuth (820) are indicated by the long and short white lines, respectively. The magnitudes of the well-measured dip and azimuth (820) are displayed with the white legend (822). It is clear in FIG. 8 that the seismic-estimated dip, strike (810), and azimuth (812) do not match the well-measured dip, strike (818), and azimuth (820). In particular, the well-measured azimuth (820) is of 315 degrees, which is consistent with the orientation of the local geological structures (824) close to the well. In the example of FIG. 8 the local geological structures (824) are faults. FIG. 8 also illustrates the region of influence (826), an ellipse centered at the intersection point (814) and that encloses all local geological structures (824) of interest.

It can be seen in FIG. 8 that the dip, strike, and azimuth of the geological surface (804) obtained after interpolating the gradient match the well-measured dip, strike (818), and azimuth (820). Furthermore, the orientation of the local geological structures (824) is maintained in the geological surface (804) obtained after interpolation of the gradient. FIG. 8 also illustrates the difference (828) between the geological surface before constraining (802) and after constraining (804). As expected, the difference (828) reaches its largest values (830) in points that are close to the intersection point (814) and diminishes to zero at the boundaries of the region of influence (826).

Returning to FIG. 4, in Block 450, a wellbore trajectory is planned using the updated geological surface, in accordance with one or more embodiments. The wellbore planning system (338) may use the knowledge of the updated geological surface to plan a wellbore trajectory (304) within the subterranean region of interest (102). The planned wellbore trajectory (304) may be influenced by shallow drilling hazards, such as gas pockets, subterranean water flows, and/or unstable/metastable fault zones. The wellbore planning system (338) may be located in the memory (909) within the computer system (900) described in FIG. 9 below.

In Block 460, a wellbore is drilled guided by the planned wellbore trajectory, in accordance with one or more embodiments. The wellbore planning system (338) may transfer the planned wellbore trajectory (304) to the drilling system (300) described in FIG. 3. The drilling system (300) may drill the wellbore along the planned wellbore trajectory (304) to access and produce the reservoir (104) to the surface (122).

Figure 9:
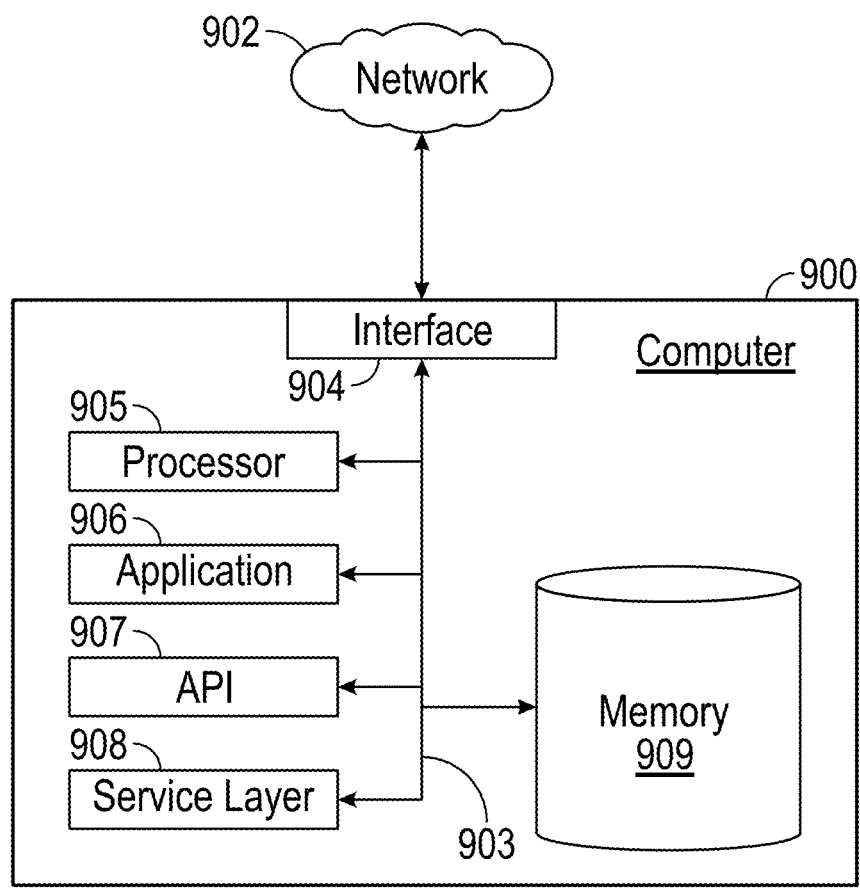
FIG. 9 illustrates a block diagram of a computer system in accordance with one or more embodiments.

In some embodiments the seismic processor (220), the logging system (336) and the wellbore planning system (338) may each include a computer system. FIG. 9 is a block diagram of a computer system (900) used to provide computational functionalities associated with described algorithms, methods, functions, processes, flows, and procedures as described in the instant disclosure, according to an implementation. The illustrated computer (900) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (900) may include a computer that includes an input device, such as a keypad, keyboard, touch screen, or other device that can accept user information, and an output device that conveys information associated with the operation of the computer (900), including digital data, visual, or audio information (or a combination of information), or a GUI.

The computer (900) can serve in a role as a client, network component, a server, a database or other persistency, or any other component (or a combination of roles) of a computer system for performing the subject matter described in the instant disclosure. The illustrated computer (900) is communicably coupled with a network (902). In some implementations, one or more components of the computer (900) may be configured to operate within environments, including cloud-computing-based, local, global, or other environment (or a combination of environments).

At a high level, the computer (900) is an electronic computing device operable to receive, transmit, process, store, or manage data and information associated with the described subject matter. According to some implementations, the computer (900) may also include or be communicably coupled with an application server, e-mail server, web server, caching server, streaming data server, business intelligence (BI) server, or other server (or a combination of servers).

The computer (900) can receive requests over network (902) from a client application (for example, executing on another computer (900)) and responding to the received requests by processing the said requests in an appropriate software application. In addition, requests may also be sent to the computer (900) from internal users (for example, from a command console or by other appropriate access method), external or third-parties, other automated applications, as well as any other appropriate entities, individuals, systems, or computers.

Each of the components of the computer (900) can communicate using a system bus (903). In some implementations, any or all of the components of the computer (900), both hardware or software (or a combination of hardware and software), may interface with each other or the interface (904) (or a combination of both) over the system bus (903) using an application programming interface (API) (907) or a service layer (908) (or a combination of the API (907) and service layer (908). The API (907) may include specifications for routines, data structures, and object classes. The API (907) may be either computer-language independent or dependent and refer to a complete interface, a single function, or even a set of APIs. The service layer (908) provides software services to the computer (900) or other components (whether or not illustrated) that are communicably coupled to the computer (900). The functionality of the computer (900) may be accessible for all service consumers using this service layer (908). Software services, such as those provided by the service layer (908), provide reusable, defined business functionalities through a defined interface. For example, the interface may be software written in JAVA, C++, or other suitable language providing data in extensible markup language (XML) format or other suitable format. While illustrated as an integrated component of the computer (900), alternative implementations may illustrate the API (907) or the service layer (908) as stand-alone components in relation to other components of the computer (900) or other components (whether or not illustrated) that are communicably coupled to the computer (900). Moreover, any or all parts of the API (907) or the service layer (908) may be implemented as child or sub-modules of another software module, enterprise application, or hardware module without departing from the scope of this disclosure.

The computer (900) includes an interface (904). Although illustrated as a single interface (904) in FIG. 9, two or more interfaces (904) may be used according to particular needs, desires, or particular implementations of the computer (900). The interface (904) is used by the computer (900) for communicating with other systems in a distributed environment that are connected to the network (902). Generally, the interface (904) includes logic encoded in software or hardware (or a combination of software and hardware) and operable to communicate with the network (902). More specifically, the interface (904) may include software supporting one or more communication protocols associated with communications such that the network (902) or interface's hardware is operable to communicate physical signals within and outside of the illustrated computer (900).

The computer (900) includes at least one computer processor (905). Although illustrated as a single computer processor (905) in FIG. 9, two or more processors may be used according to particular needs, desires, or particular implementations of the computer (900). Generally, the computer processor (905) executes instructions and manipulates data to perform the operations of the computer (900) and any algorithms, methods, functions, processes, flows, and procedures as described in the instant disclosure.

The computer (900) also includes a memory (909) that holds data for the computer (900) or other components (or a combination of both) that may be connected to the network (902). For example, memory (909) may be a database storing data consistent with this disclosure. Although illustrated as a single memory (909) in FIG. 9, two or more memories may be used according to particular needs, desires, or particular implementations of the computer (900) and the described functionality. While memory (909) is illustrated as an integral component of the computer (900), in alternative implementations, memory (909) may be external to the computer (900).

The application (906) is an algorithmic software engine providing functionality according to particular needs, desires, or particular implementations of the computer (900), particularly with respect to functionality described in this disclosure. For example, application (906) can serve as one or more components, modules, applications, etc. Further, although illustrated as a single application (906), the application (906) may be implemented as multiple applications (906) on the computer (900). In addition, although illustrated as integral to the computer (900), in alternative implementations, the application (906) may be external to the computer (900).

There may be any number of computers (900) associated with, or external to, a computer system containing computer (900), each computer (900) communicating over network (902). Further, the term "client." "user," and other appropriate terminology may be used interchangeably as appropriate without departing from the scope of this disclosure. Moreover, this disclosure contemplates that many users may use one computer (900), or that one user may use multiple computers (900).

In some embodiments, the computer (900) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method comprising:
   obtaining, using a seismic acquisition system, a seismic dataset regarding a subsurface region of interest;
   obtaining, using a logging tool, a well log for each of a plurality of wellbores penetrating the subsurface region of interest;
   determining a sequence of surfaces from the seismic dataset, wherein each surface among the sequence of surfaces represents a geological surface within the subsurface region of interest, wherein the sequence of surfaces is ordered by increasing depth within the subsurface region of interest; and
   for each surface in order:
      obtaining, using the logging tool, a partial well log for a partially-drilled wellbore within the subsurface region of interest,
      associating a plurality of points to each surface,
      determining seismic-estimated orientation data at the plurality of points based on the seismic dataset,
      determining a plurality of intersection points among the plurality of points, wherein each of the plurality of intersection points represents where each of the plurality of wellbores and the partially-drilled wellbore intersects with the geological surface,
      determining well-measured orientation data at the plurality of intersection points based on the well log for the plurality of wellbores and the partial well log,
      generating an updated surface by determining a region of influence around each of the plurality of intersection points and updating the seismic-estimated orientation data at the plurality of points within the region of influence based on the well-measured orientation data,
      determining, using a wellbore planning system, an updated wellbore trajectory for an undrilled portion of the partially-drilled wellbore based on the updated surface, and
      drilling, using a drilling system, a portion of the undrilled portion of the partially drilled wellbore along the updated wellbore trajectory.

2. The method of claim 1, wherein the seismic-estimated orientation data comprises a dip angle and an azimuth.

3. The method of claim 1, wherein generating the updated surface comprises performing 2D cubic spline interpolation.

4. The method of claim 1, wherein the region of influence is of elliptical shape centered at each of the plurality of intersection points.

5. The method of claim 1, wherein generating the updated surface further comprises:

obtaining structure orientation data of a geological structure in the subsurface region of interest;

determining a plurality of local points by applying a first coordinate transformation to the plurality of points in the region of influence based on the structure orientation data;

determining rotated orientation data at the plurality of local points based, at least in part, on the well-measured orientation data; and updating the seismic-estimated orientation data at the plurality of points in the region of influence by applying a second coordinate transformation to the rotated orientation data.

6. A non-transitory computer-readable medium comprising computer-executable instructions stored thereon that, when executed on a processor, cause the processor to perform:

obtaining, from a seismic acquisition system, a seismic dataset regarding a subsurface region of interest;

obtaining, from a logging tool, a well log for each of a plurality of wellbores penetrating the subsurface region of interest, determining a sequence of surfaces from the seismic dataset, wherein each surface among the sequence of surfaces represents a geological surface within the subsurface region of interest, wherein the sequence of surfaces is ordered by increasing depth within the subsurface region of interest; and for each surface in order:

obtaining, using the logging tool, a partial well log for a partially-drilled wellbore within the subsurface region of interest, associating a plurality of points to each surface, determining seismic-estimated orientation data at the plurality of points based on the seismic dataset, determining a plurality of intersection points among the plurality of points, wherein each of the plurality of intersection points represents where each of the plurality of wellbores and the partially-drilled wellbore intersects with the geological surface, determining well-measured orientation data at the plurality of intersection points based on the well log for the plurality of wellbores and the partial well log, generating an updated surface by determining a region of influence around each of the plurality of intersection points and updating the seismic-estimated orientation data at the plurality of points within the region of influence based on the well-measured orientation data, and determining an updated wellbore trajectory for an undrilled portion of the partially-drilled wellbore based on the updated surface, wherein a drilling system is configured to drill a portion of the undrilled portion of the partially-drilled wellbore along the updated wellbore trajectory.

7. The non-transitory computer-readable medium of claim 6, wherein the computer-executable instructions further cause the processor to perform:

generating the updated surface by performing 2D cubic spline interpolation.

8. The non-transitory computer-readable medium of claim 6, wherein the computer-executable instructions further cause the processor to perform:

obtaining structure orientation data of a geological structure in the subsurface region of interest;

determining a plurality of local points by applying a first coordinate transformation to the plurality of points in the region of influence based on the structure orientation data;

determining rotated orientation data at the plurality of local points based, at least in part, on the well-measured orientation data; and updating the seismic-estimated orientation data at the plurality of points in the region of influence by applying a second coordinate transformation to the rotated orientation data.

9. A system comprising:

a seismic acquisition system configured to record a seismic dataset regarding a subsurface region of interest;

a logging tool configured to record a well log for each of a plurality of wellbores penetrating the subsurface region of interest;

a seismic processor configured to:

receive, from the seismic acquisition system, the seismic dataset, receive, from the logging tool, the well log for the plurality of wellbores, and determine a sequence of surfaces from the seismic dataset, wherein each surface among the sequence of surfaces represents a geological surface within the subsurface region of interest, wherein the sequence of surfaces is ordered by increasing depth within the subsurface region of interest, for each surface in order:

receive, from the logging tool, a partial well log for a partially-drilled wellbore within the subsurface region on interest;

associate a plurality of points to each surface;

determine seismic-estimated orientation data at the plurality of points based on the seismic dataset;

determine a plurality of intersection points among the plurality of points, wherein each of the plurality of intersection points represents where each of the plurality of wellbores and the partially-drilled wellbore intersects with the geological surface;

determine well-measured orientation data at the plurality of intersection points based on the well log for the plurality of wellbores and the partial well log; and generate an updated surface by determining a region of influence around each of the plurality of intersection points and updating the seismic-estimated orientation data at the plurality of points within the region of influence based on the well-measured orientation data;

a wellbore planning system configured to determine an updated wellbore trajectory for an undrilled portion of the partially-drilled wellbore based on the updated surface; and a drilling system configured to drill a portion of the undrilled portion of the partially-drilled wellbore along the updated wellbore trajectory.

10. The system of claim 9, wherein the seismic-estimated orientation data comprises a dip angle and an azimuth.

11. The system of claim 9, wherein the seismic processor is further configured to generate the updated surface by performing 2D cubic spline interpolation.

12. The system of claim 9, wherein the region of influence is of elliptical shape centered at each of the plurality of intersection points.

13. The system of claim 9, wherein the seismic processor is further configured to generate the updated surface by:
- obtaining structure orientation data of a geological structure in the subsurface region of interest;
- determining a plurality of local points by applying a first coordinate transformation to the plurality of points in the region of influence based on the structure orientation data;
- determining rotated orientation data at the plurality of local points based, at least in part, on the well-measured orientation data; and
- updating the seismic-estimated orientation data at the plurality of points in the region of influence by applying a second coordinate transformation to the rotated orientation data.

* * * * *